United States Patent

Itami et al.

[11] Patent Number: 6,125,628
[45] Date of Patent: Oct. 3, 2000

[54] ENGINE STARTUP AIR-FUEL RATIO CONTROLLER

[75] Inventors: Takehiko Itami, Yokohama; Yoshiaki Yoshioka, Sagamihara; Hatsuo Nagaishi, Yokohama, all of Japan

[73] Assignee: Nissan Motor Co., Ltd., Kanagawa, Japan

[21] Appl. No.: 08/758,507

[22] Filed: Dec. 2, 1996

[30] Foreign Application Priority Data

Dec. 1, 1995 [JP] Japan .................................. 7-314241

[51] Int. Cl.[7] .............................. F02D 41/06; F01N 3/00
[52] U.S. Cl. ................................................ 60/284; 60/285
[58] Field of Search ........................................ 60/284, 285

[56] References Cited

U.S. PATENT DOCUMENTS

| | | | |
|---|---|---|---|
| 3,949,551 | 4/1976 | Eichler et al. | 60/284 X |
| 4,644,921 | 2/1987 | Kobayashi et al. | 123/689 |
| 5,564,404 | 10/1996 | Takahashi et al. | 60/285 X |
| 5,606,855 | 3/1997 | Tomisawa | 60/285 X |

*Primary Examiner*—Tony M. Argenbright
*Attorney, Agent, or Firm*—Lowe, Price, LeBlanc & Becker

[57] ABSTRACT

In a water-cooled engine comprising a catalyst for purifying exhaust in an exhaust pipe, a catalyst is rendered active at an early stage by arranging an air-fuel ratio of a fuel mixture supplied to the engine to be lean on startup. A catalyst activation water temperature corresponding to full activation of this catalyst is set, and the air-fuel ratio is arranged to be leaner than a theoretical air-fuel ratio during a period from engine startup to when a cooling water temperature reaches the catalyst activation water temperature. After the cooling water temperature reaches the catalyst activation water temperature, the air-fuel ratio is shifted to the stoichiometric air-fuel ratio. In this way, lean control is optimized to activate the catalyst.

6 Claims, 8 Drawing Sheets ly ratio contr controller.
ENGINE STARTUP AIR-FUEL RATIO CONTROLLER

FIELD OF THE INVENTION

This invention relates to air-fuel ratio control during startup of an engine provided with an exhaust purification catalyst.

BACKGROUND OF THE INVENTION

In automobile and other engines, it is common practice to instal a three-way catalytic converter in an exhaust passage to transform nitric oxides (NOx), hydro carbons (HC) and carbon monoxide (CO), which are toxic components of exhaust gas, into non-toxic components.

Three-way catalytic converters do not become active until the temperature has risen to a predetermined temperature, and do not perform correctly until they become active. Until the three-way catalyst has become active, therefore, it may occur that exhaust is discharged into the atmosphere without completely removing toxic components.

One method of activating the three-way catalyst at an early stage is to make the air-fuel ratio of the gas mixture aspirated into the engine leaner than the theoretical (stoichiometric) air-fuel ratio to increase the oxygen concentration in the exhaust, thereby promoting oxidation reactions in the converter so as to raise the catalyst temperature. By making the air-fuel ratio leaner, the discharge amount of HC is also decreased.

In this case, the fuel supply amount is often controlled so that the air-fuel ratio is lean until a predetermined time has passed after engine startup, or until the engine cooling water temperature has reached a predetermined value.

However, the time taken for the catalyst to become active or the cooling water temperature when the catalyst does become active are not constant due to differences of engine temperature or ambient conditions during engine startup. These differences thus tend to make the time for which the lean air-fuel ratio is applied too long or too short. When the applied time is too short, catalyst activation is delayed, and when the applied time is too long, the converter temperature rises too high leading to an increase of NOx discharge and early deterioration of the catalyst. Tokkai Sho 60-230532 published by the Japanese Patent Office in 1985 suggests making the air-fuel ratio leaner during engine warmup after the cooling water temperature has reached a predetermined level, and changing this lean air-fuel ratio according to the cooling water temperature.

However, in the case of this control device, lean control is performed only after the cooling water temperature has reached a predetermined value, and the air-fuel ratio is enriched from startup to when the cooling water temperature reaches the predetermined value. The object of this prior art control device is to maintain engine running performance during startup and to decrease the fuel consumption during engine warmup. This type of control does, however, not necessarily lead to the catalyst becoming active at an early stage.

SUMMARY OF THE INVENTION

It is therefore an object of this invention to implement lean control of an air-fuel ratio which is optimal for early activation of a catalyst.

It is a further object of this invention to rapidly terminate lean control once catalyst activation has been completed. It is still a further object of this invention to ensure that the lean state does not persist in the event of any abnormality.

In order to achieve the above objects, this invention provides a device for controlling an air-fuel ratio of a fuel mixture supplied to a water-cooled engine on startup of the engine. The engine is provided with a catalyst for purifying exhaust in an exhaust passage. The device comprises a mechanism for detecting the engine startup, a mechanism for detecting engine cooling water temperature, a mechanism for setting a catalyst activation water temperature corresponding to full activation of the catalyst, a mechanism for determining whether or not the cooling water temperature has reached the catalyst activation water temperature, and a mechanism for shifting the air-fuel ratio to a leaner state than a stoichiometric air-fuel ratio during a period from engine startup to when the cooling water temperature reaches the catalyst activation water temperature, and shifting back the air-fuel ratio in the leaner state towards the stoichiometric air-fuel ratio after the cooling water temperature has reached the catalyst activation water temperature.

It is preferable that the device further comprises a mechanism for detecting an engine running state, and the shifting mechanism comprises a mechanism for correcting leanness of the air-fuel ratio in the leaner state according to the running state.

It is also preferable that the device further comprises a mechanism for measuring an elapsed time after engine startup, and the shifting mechanism comprises a mechanism for starting shifting of the air-fuel ratio to a leaner state when the measured time reaches a predetermined value.

It is also preferable that the device further comprises a mechanism for performing the shifting and shifting back in a stepwise manner.

It is also preferable that the device further comprises a mechanism for detecting an engine rotation speed, a mechanism for detecting an engine load, a mechanism for setting a basic fuel supply amount according to the engine rotation speed and load, a mechanism for setting a water temperature increase coefficient based on the cooling water temperature, and a mechanism for correcting the basic supply amount by the water temperature increase coefficient so as to determine a fuel supply amount, and the shifting mechanism comprises a mechanism for shifting the air-fuel ratio to lean by correcting the water temperature increase coefficient.

It is also preferable that the device further comprises a mechanism for measuring an elapsed time after engine startup, and the shifting mechanism comprises a mechanism for shifting back the air-fuel ratio in the leaner state towards the stoichiometric air-fuel ratio regardless of the cooling water temperature when the measured time has reached a predetermined value.

The details as well as other features and advantages of this invention are set forth in the remainder of the specification and are shown in the accompanying drawings.

DESCRIPTION OF THE PREFERRED EMBODIMENTS

Figure 1:
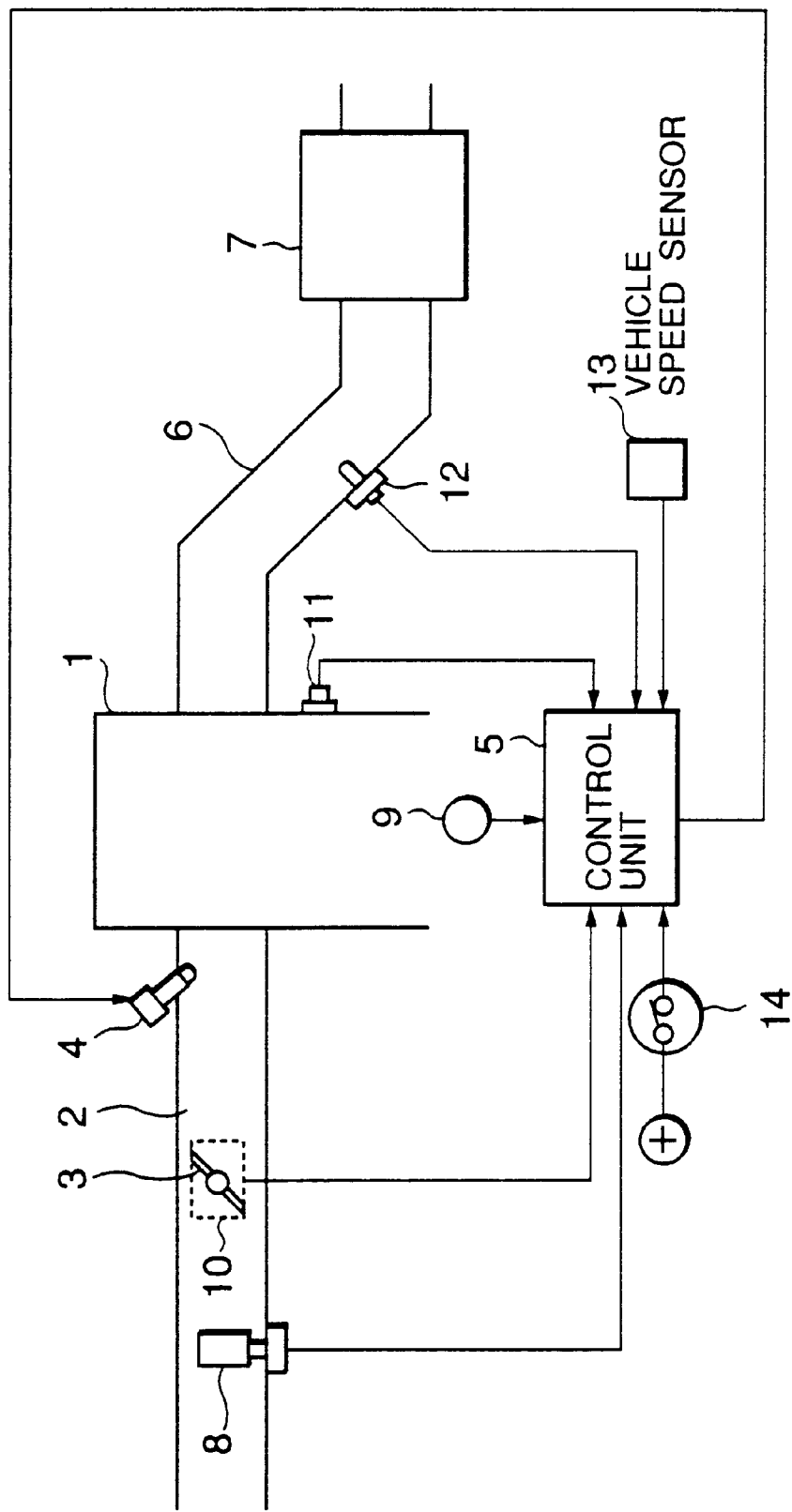
FIG. 1 is a schematic diagram of an air-fuel ratio controller according to this invention.

Referring to FIG. 1 of the drawings, an automobile water-cooled multi-cylinder engine 1 is provided with an intake passage 2 and throttle 3. The intake passage 2 forms an intake manifold comprising branch pipes equal in number to the cylinders of the engine downstream of the throttle 3. These branch pipes are each provided with a fuel injector 4. The fuel injectors 4 open according to a fuel injection pulse signal sent from a control unit 5, and inject fuel at a predetermined pressure into the branch pipes. The fuel injection pulse signal is output to each of the injectors 4 at a predetermined rotation position of the engine. The fuel injection amount of the injector 4 is determined according to the pulse width of this signal.

The exhaust of the engine 1 is discharged via an exhaust passage 6 through an exhaust manifold which is a group of branch pipes equal in number to the cylinders of the engine. A catalyst converter 7 incorporating a three-way catalyst is provided midway in the exhaust passage 6.

The control unit 5 comprises a microcomputer. The control unit 5 performs various computations to determine the fuel injection pulse width based on various input signals, and a corresponding fuel injection pulse width signal is output to the fuel injectors 4.

Signals from an air flow meter 8 which detects an intake flowrate Q upstream of the throttle 3 in the intake passage 2, a crank angle sensor 9 which detects a rotation angle and rotation speed of a crankshaft, a throttle opening sensor 10 which detects an opening of the throttle 3, and a water temperature sensor 11 which detects the cooling water temperature of the engine 1, are input to the control unit 5. The throttle opening sensor 10 also functions as an idle switch which detects the fully closed position of the throttle 3.

Signals are also input from an $O_2$ sensor 12 which detects an oxygen concentration in the exhaust upstream of the catalytic converter 7 of the exhaust passage 6, a vehicle speed sensor 13 which detects a vehicle speed VSP, and a key switch 14. The oxygen concentration in the exhaust detected by the $O_2$ sensor 12 closely corresponds to the air-fuel ratio of the fuel mixture input to the cylinders, and the output signal of the $O_2$ sensor 12 is made to vary when this air-fuel ratio exceeds the stoichiometric air-fuel ratio. The key switch 14 outputs an ON/OFF signal showing the state of a start switch which starts the engine.

Figure 2:
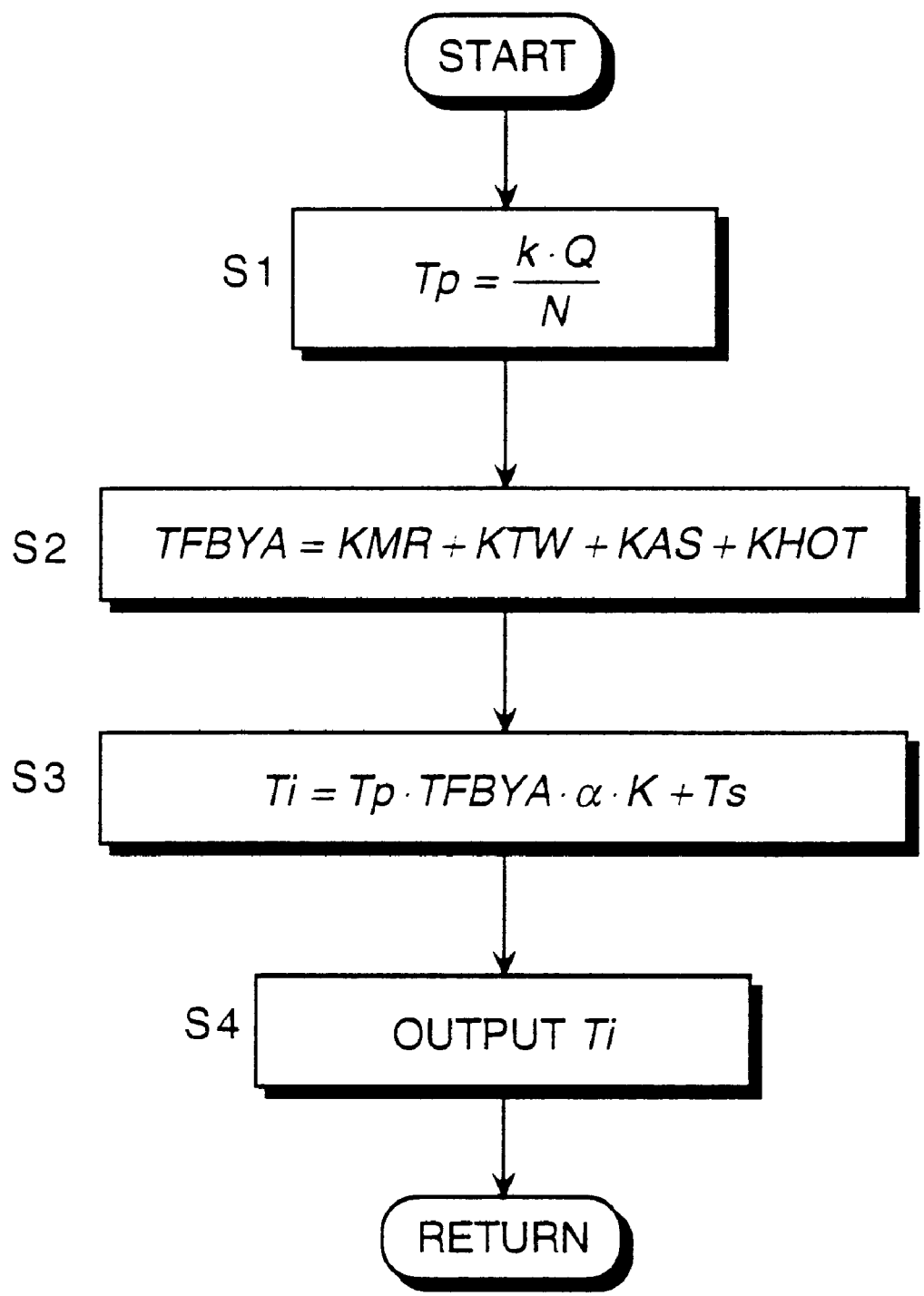
FIG. 2 is a flowchart describing a fuel injection amount computation process according to the controller.

The control unit 5 calculates an injection amount of the injector 4 according to the flowchart of FIG. 2, based on the aforesaid input signals.

In a step S1, a basic fuel injection amount Tp is computed from an intake air amount Q detected by the air flow meter 8, and an engine rotation speed N detected from the signal output by the crank angle sensor 9, using the following equation:

$$Tp = \frac{k \cdot Q}{N} \quad (1)$$

where, k is a constant.

In a step S2, various correction coefficients are calculated using the following equation:

$$TFBA = KMR + KTW + KAS + KHOT \quad (2)$$

where,

KMR=air-fuel ratio correction coefficient
KTW=water temperature increase coefficient
KAS=post-startup increase coefficient
KHOT=high water temperature increase coefficient.

Herein, the water temperature increase coefficient KTW comprises a positive increase coefficient PKTW for increasing fuel amount to improve engine startup performance, and a negative increase coefficient MKTW for making the air-fuel ratio leaner so as to activate the catalyst at an earlier time. The setting of these values is performed by a method described hereafter according to engine running conditions.

In a step S3, the basic fuel injection amount Tp is corrected by various correction coefficients TFBYA, an air-fuel ratio feedback correction coefficient $\alpha$, an air-fuel ratio learning correction coefficient K and a battery voltage correction value Ts depending on battery voltage, and a final fuel injection amount Ti is computed:

$$Ti = Tp \cdot TFBYA \cdot \alpha \cdot K + Ts \quad (3)$$

The air-fuel ratio feedback correction coefficient $\alpha$ is set by proportional integral control based on the voltage signal output by the $O_2$ sensor 12. The voltage output by the $O_2$ sensor 12 is compared with a predetermined slice level to determine whether the air-fuel ratio is rich or lean, and a predetermined proportional amount P is added to the air-fuel ratio feedback coefficient $\alpha$ when there is a change-over from rich to lean. A predetermined integral part I is added at predetermined times when the lean state continues, where I<P. Conversely, the proportional amount P is subtracted from the air-fuel ratio feedback coefficient $\alpha$ when there is a change-over from lean to rich, and an integral part I is subtracted at predetermined times when the rich state continues. This air-fuel ratio feedback control is performed only when predetermined feedback control conditions exist, and in lean control during engine startup for catalyst activation which is the object of this invention, $\alpha$ is fixed at 1.

The air-fuel ratio learning correction coefficient K is a value learned for each of a plurality of running conditions which divide the air-fuel ratio feedback correction coefficient $\alpha$ according to the basic fuel injection amount Tp which expresses the engine load and the engine rotation speed N. The battery voltage correction amount Ts is a correction value for increasing the injection amount according to battery voltage, as there is a delay in the action of the injector 4 depending on this voltage.

In a step S4, an injection pulse signal having a pulse width corresponding to the computed fuel injection amount Ti is output to the injector 4 with a predetermined timing based on the engine rotation angle.

Next, the setting of the water temperature increase coefficient KTW, which is a feature of this invention, will be described with reference to FIGS. 3, 4, 5A–5C.

Figure 3:
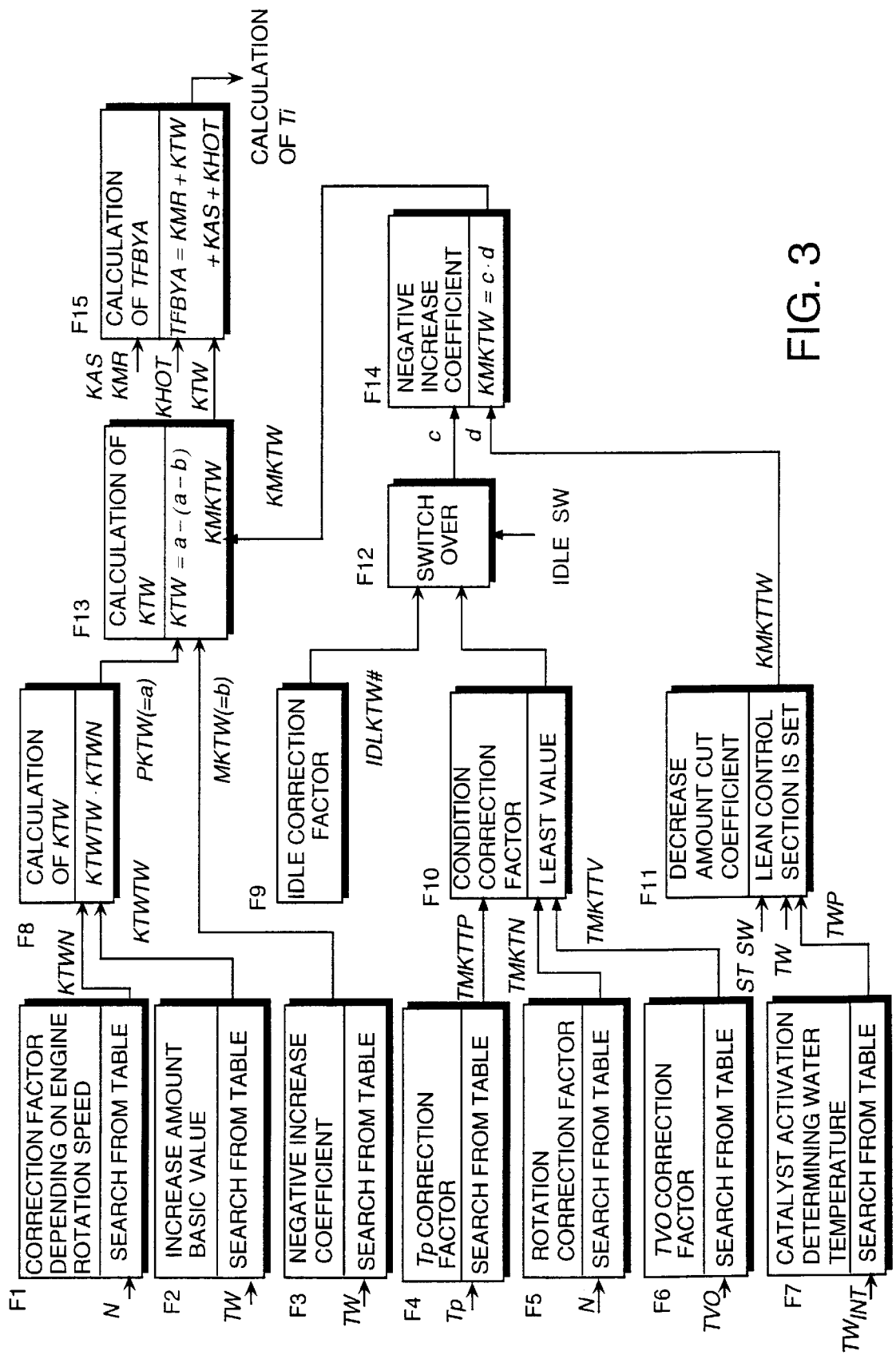
FIG. 3 is a block diagram describing a setting process of a target air-fuel ratio according to the controller.

FIG. 3 shows the functions with which the control unit 5 is provided to perform the setting of the water temperature increase coefficient KTW. As can be seen in a function F13 of FIG. 3, the water temperature increase coefficient KTW is determined by the following equation, and the correction coefficients TFBYA are calculated by the aforesaid equation (2) in a function F14.

$$KTWa - (a-b) \cdot KMKTW \quad (4)$$

a is equal to the aforesaid positive increase coefficient PKTW.

This is the same as the water temperature increase coefficient applied in the prior art, and is calculated by the following equation in a function F8.

$$a = KTWTW \cdot KTWN \tag{5}$$

KTWTW is an increase amount basic value which is searched corresponding to the cooling water temperature TW during startup from a table provided in a function F2. KTWN is a correction factor depending on the engine rotation speed N which is searched from a table provided in a function F1. These settings are the same as the settings in the prior art.

b is equal to the aforesaid negative increase coefficient MKTW, and is searched corresponding to the cooling water temperature TW from a table in the function F2. The value of MKTW is set so that the air-fuel ratio does not become too rich even when fuel increase corrections are applied, and is set for example such that an air oversupply factor $\lambda$ is 1.05.

KMKTW in equation (4) is a weighting coefficient of the negative increase coefficient MKTW in the calculation of the water temperature increase coefficient KTW, and it takes a value between 0 and 1. When KMKTW=0, the water temperature increase coefficient KTW=a, and the same fuel increase is performed as in the prior art. When KMKTW=1, the water temperature increase coefficient KTW=b, and the air-fuel ratio is leaner than the theoretical air-fuel ratio so as to activate the catalyst.

The weighting coefficient KMKTW is calculated from the following equation shown in the function F14:

$$KMKTW = c \cdot d \tag{6}$$

Herein, c is a condition correction factor set according to the engine running conditions. When the idle switch is ON and the vehicle speed VSP is less than 4 km/hour, or when the idle switch is ON and the engine rotation speed N is less than a predetermined value $N_1$ (e.g. 1000 rpm), the condition correction factor c is set to a preset idle correction factor IDLKTW# (e.g. IDLKTW#=0.4) in a function F9. The determination of these conditions is performed in a function F12.

When either of the aforesaid two conditions does not hold even when the idle switch is ON, or when the idle switch is OFF, the condition correction factor c is determined as follows. From a Tp correction factor TMKTTP searched according to the basic fuel injection amount Tp from a table in the function F4, a rotation correction factor TMKTN searched according to the engine rotation speed N from a table in a function F5, and a TVO correction factor TMKTTV searched according to a throttle opening TVO from a table in a function F6, the least of these values is selected in a function F10 and set equal to the condition correction factor c.

Figure 4:
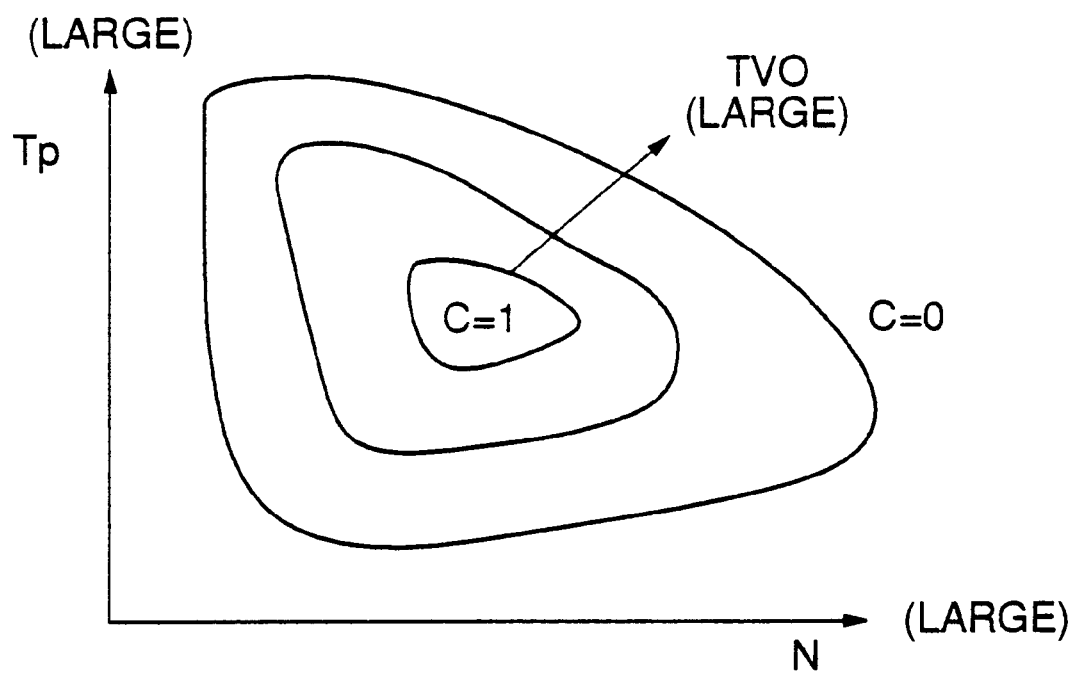
FIG. 4 is a diagram describing an engine running region in which the lean air-fuel ratio is applied by the controller.

The relation between the condition correction factor c and engine running region, which is based on these three running conditions, is shown in FIG. 4. With the throttle opening TVO as a parameter, the condition correction factor c=1 in the central region of the diagram, and c decreases with increasing distance away from this area. By setting c in this way, lean control is performed in an area where engine running is stable By providing the Tp correction factor TMKTN, rotation correction factor TMKTN and the TVO correction factor TMKTTV respectively as three two-dimensional tables, less program capacity is required than if they were stored as one three-dimensional table.

d is a decrease amount cut coefficient KMKTTW which gradually varies the weighting coefficient KMTKW when there is a shift to lean control after engine startup or a shift to rich after lean control. After a signal from the key switch 14 has switched ON, the decrease amount cut coefficient KMKTTW is set to 0 until the engine starts, and when there is a shift to lean control after a predetermined time $T_1$ (e.g. 2 seconds) elapses after the engine starts and the signal from the key switch 14 switches OFF, the leanness is increased by gradually increasing KMKTTW towards 1 in preset increments of DMKTWS#. When the cooling water temperature TW reaches a catalyst activation determining water temperature $TW_P$ set in a function F7 based on a cooling water temperature $TW_{INT}$ during engine startup, and the air-fuel ratio shifts from lean control to rich control, KMKTTW is gradually decreased to 0 in preset decrements of DMKTWE#. In this way, the air-fuel ratio is smoothly varied when there is a shift from engine startup to lean control, or from lean control to rich control.

According to the aforesaid control, when the engine is started up, the catalyst activation determining water temperature $TW_P$ is first set based on the cooling water temperature at that time, then lean control is performed to activate the catalyst after a predetermined time $T_1$ has elapsed. Herein, the water temperature increase coefficient KTW is varied as the proportion of positive and negative increase coefficients is varied according to the running conditions, and the air-fuel ratio is gradually increased to a predetermined lean state as the leanness is enhanced. After the air-fuel ratio reaches the predetermined lean state, the air-fuel ratio is maintained in that lean state until the cooling water temperature TW reaches the catalyst activation water temperature TWP. After the cooling water temperature TW reaches the catalyst activation water temperature TWp, the proportion of positive and negative increase coefficients is varied in the opposite sense to when there was a shift to lean control, and the air-fuel ratio is gradually controlled to the theoretical air-fuel ratio.

Figure 5A:
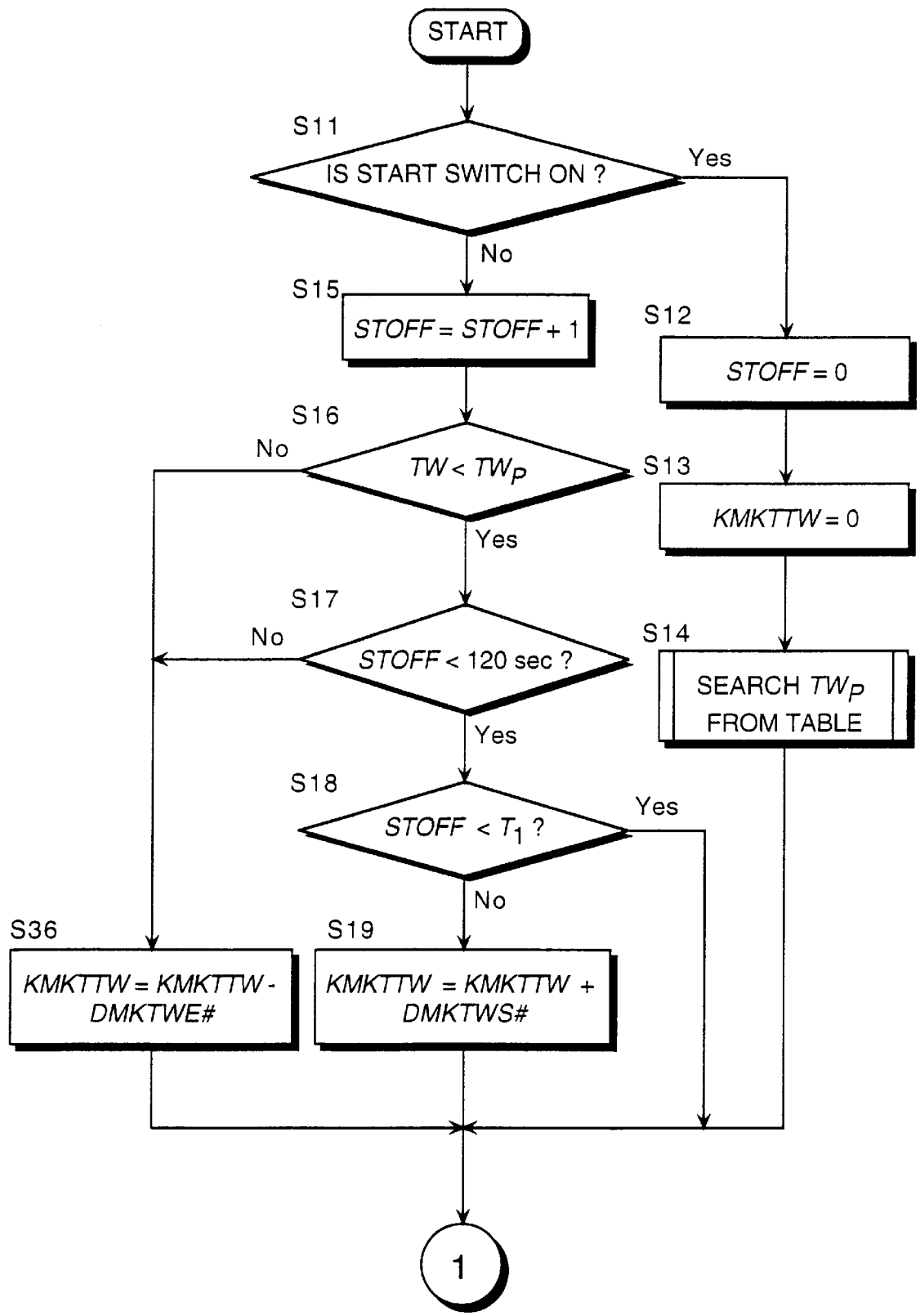
FIGS. 5A–5C are flowcharts describing a computation process of a water temperature coefficient by the controller.
Figure 5B:
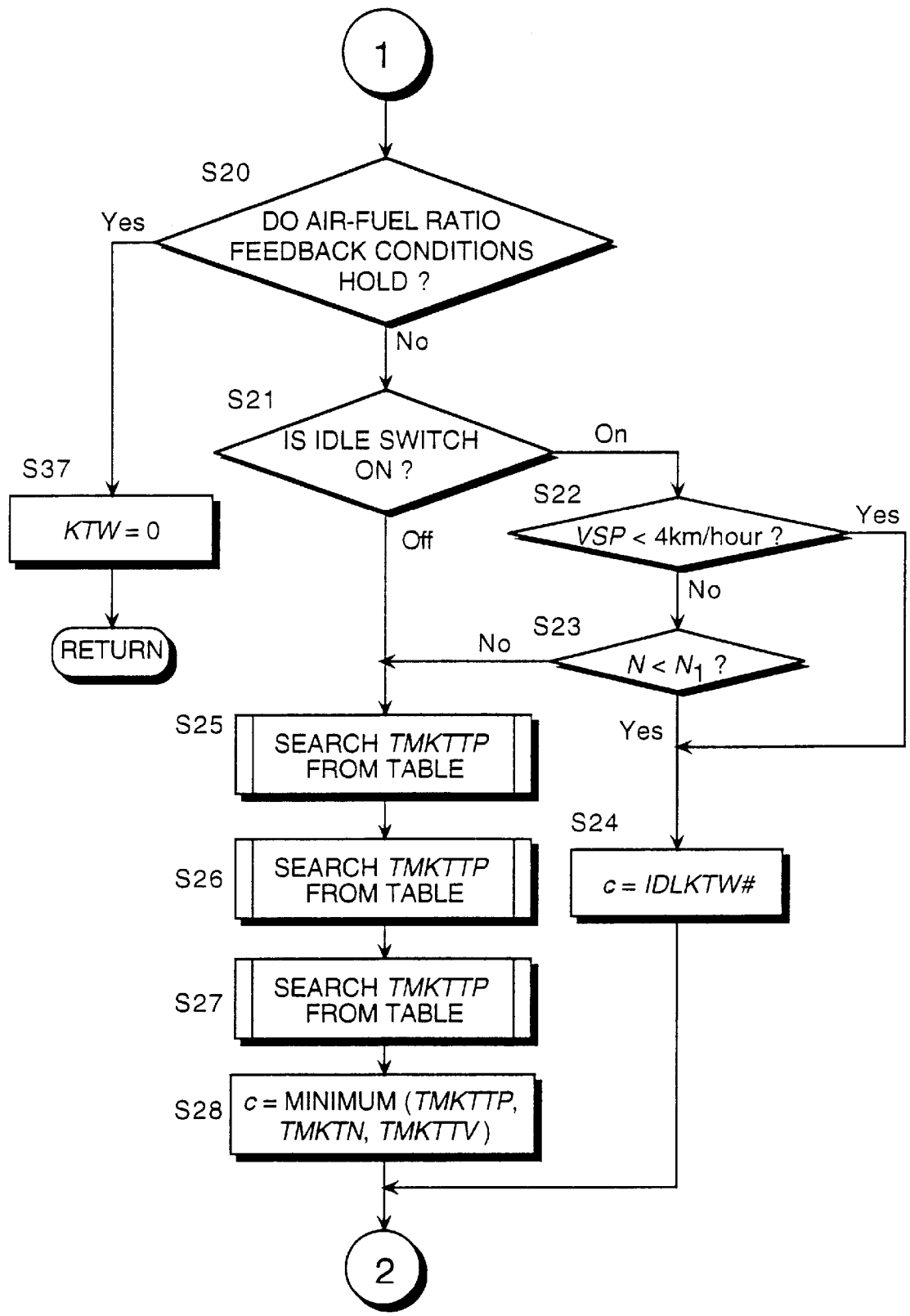

Next, the process of computing the water temperature coefficient KTW performed by the control unit 5, will be described with reference to FIGS. 5A–5C. This process is executed once every 10 milliseconds.

In a step S11, it is determined from the signal of the key switch 14 whether or not the start switch is ON or OFF, and whether the engine has stopped or not.

When the start switch is ON or the engine has stopped, in a step S12, a count value STOFF of a counter which measures the time for which the start switch is OFF is reset to 0, and in a step S13, the decrease amount cut coefficient KMKTTW is initialized to 0. Next, in a step S14, the activation determining water temperature $TW_P$ is searched from the table of F7 based on the cooling water temperature $TW_{INT}$ detected by the water temperature sensor 11. The activation determining water temperature $TW_P$ is set for example to $TW_P=TW_{INT}+20°$ C. when $TW_{INT} \leq 50°$ C., and to $TW_P=70°$ C. when $TW_{INT}>50°$ C. After these settings have been made, the routine proceeds to a step S20.

In cases other than the above, i.e. when the start switch is OFF and the engine is rotating, the routine proceeds to a step S15.

In the step S15, the aforesaid count value STOFF of the counter is counted up. This count-up is performed every 0.1 seconds, so the count up is performed every 10 times the routine is executed.

In a step S16, the cooling water temperature TW and activation determining water temperature $TW_P$ are compared. When $TW<TW_P$, in a step S17, the count value STOFF is compared with 120 seconds which is a preset lean shift limiting time, and when STOFF has not reached this limiting time, the routine proceeds to a step S18. It will be noted that 120 seconds is only one example of the lean shift limiting time, and that this time is not limited to 120 seconds.

In the step S18, it is determined whether or not the count value STOFF has reached the predetermined time $T_1$. When STOFF<$T_1$, the routine proceeds directly to a step S20. As the processing of the steps S12–S14 is performed first during engine startup, when STOFF<$T_1$ in the step S18, the decrease amount cut coefficient KMKTTW is set to 0. In this case therefore, the weighting coefficient calculated in a step S29 described hereafter is 0, and the normal startup increase correction is applied.

When STOFF≧$T_1$ in the step S18, it is time to perform lean control, and the routine proceeds to a step S19.

Thus, as the shift to lean control is made to occur after a predetermined time $T_1$ has elapsed from engine startup, this invention may be applied without modifying the settings of various engine startup coefficients commonly used in the prior art.

In the step S19, the preset increment DMKTWS# is added to the decrease amount cut coefficient KMKTTW which was initialized in the step S13.

In the step S20, it is determined whether or not air-fuel ratio feedback conditions hold. As air-fuel ratio feedback conditions do not hold until a certain time after startup, the routine proceeds to a step S21 during engine warmup. In the step S21, it is determined whether or not the idle switch is ON or OFF. When the idle switch is ON, in a step S22, the vehicle speed VSP is compared with the predetermined value of 4 km/hour, and in a step S23, the engine rotation speed N is compared with the predetermined value $N_1$. When either VSP<4 km/hour or N<$N_1$, the routine proceeds to a step S24, and the condition correction coefficient c is set to the idle correction factor IDLKTW#.

When on the other hand it is determined in the step S21 that the idle switch is OFF, steps S25–S28 are successively executed. The Tp correction factor TMKTTP, rotation correction factor TMKTN and TVO correction factor TMKTTV are respectively searched from the tables of F4, F5 and F6, and the least of these values is set equal to the condition correction factor c.

Figure 5C:
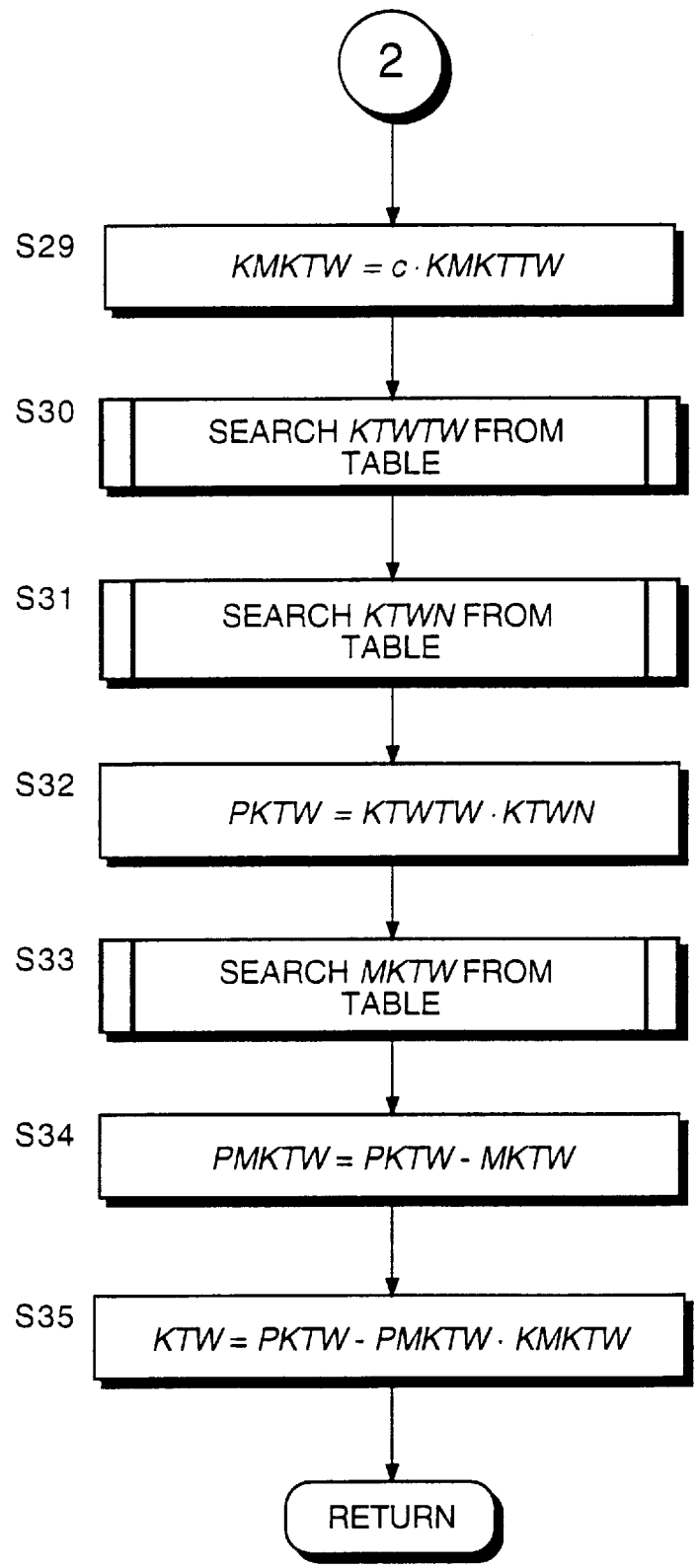

After the condition correction factor c is set in the step S24 or the step S28, steps S29–S35 in FIG. 5C are successively executed.

In the step S29, a decrease amount factor KMKTW is calculated from the condition correction factor c and decrease amount cut coefficient KMKTTW by the equation KMKTW=c·KMKTTW. In the step S30, the increase amount basic value KTWTW is searched from the table of F2 based on the cooling water temperature TW. In the step S31, the rotation correction factor KTWN is searched from the table of F1 based on the engine rotation speed N. In the step S32, the positive increase coefficient PKTW is calculated from the increase amount basic value KTWTW and the rotation correction factor KTWN by the equation PKTW= KTWTW·KTWN In the step S33, the negative increase coefficient MKTW is searched from the table of F3 based on the cooling water temperature TW. In the step S34, a difference PMKTW between the positive increase coefficient PKTW and negative increase coefficient MKTW is calculated. In the step S35, the final water temperature increase coefficient KTW is computed by subtracting a value obtained by multiplying the decrease correction coefficient KMKTW by PMKTW, from the positive increase coefficient PKTW.

After lean control has begun, each time the process ends, i.e. every 10 milliseconds, the decrease amount cut coefficient KMKTTW is increased in increments of DMKTWS# in the step S19 until KMKTTW=1. The negative part of the water temperature increase coefficient KTW is thereby increased, and the activation of the three-way catalyst is gradually promoted by intensifying lean control.

Subsequently, in a step S16, when the cooling water temperature TW reaches the activation determining temperature TWp, it is determined that the three-way catalyst is activated, so in a step S36, the decrease amount cut coefficient KMKTTW is decreased in decrements of DMKTWE#. In this way, the lean control is gradually terminated. In this sequence, each time the process ends, i.e. every 10 milliseconds, the decrease amount cut coefficient KMKTTW gradually decreases until KMKTTW=0 in the step S36, so the negative part of the water temperature increase coefficient KTW decreases, and the air-fuel ratio gradually moves toward the theoretical air-fuel ratio. After this, when air-fuel ratio feedback conditions hold in the step S20, the water temperature increase coefficient KTW is set to 0 in a step S37, and startup control is terminated.

Figure 6:
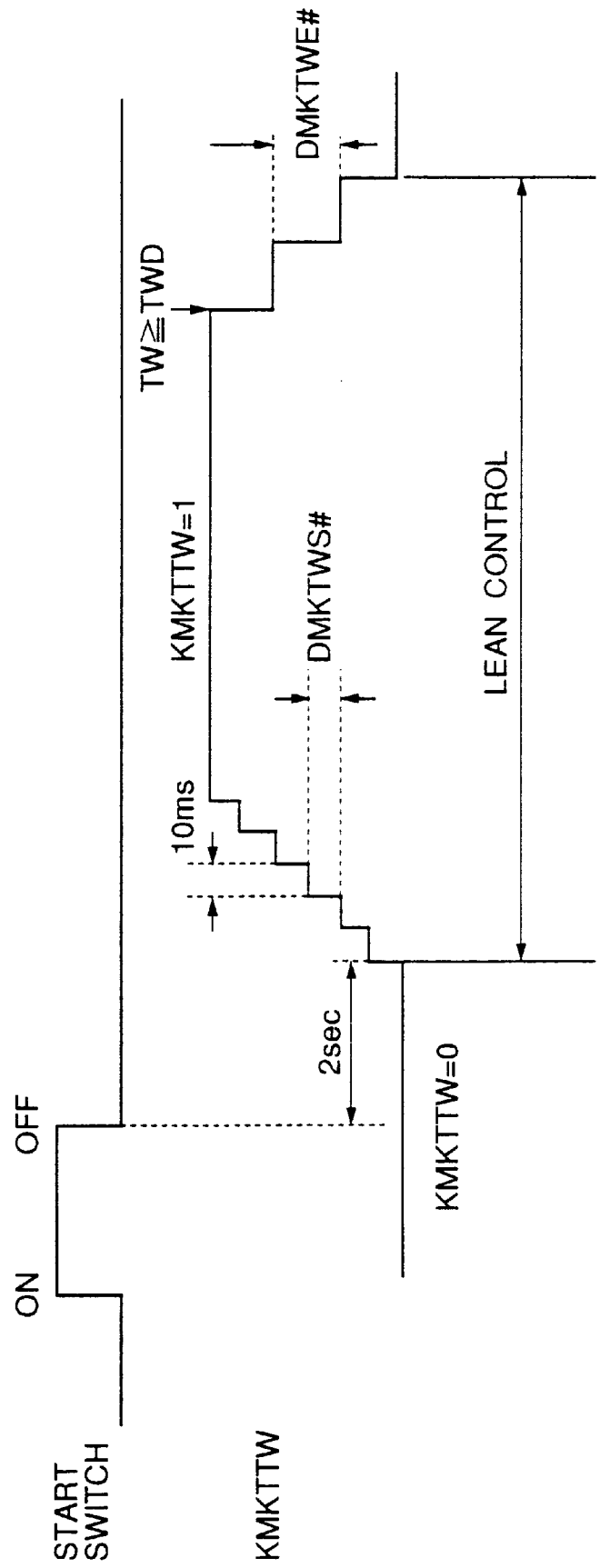
FIG. 6 is a timing chart showing the decrease of a decrease cut coefficient KMKTTW after engine startup according to the controller.

FIG. 6 shows the variation of the decrease amount cut coefficient KMKTTW after the start switch has switched ON to when air-fuel ratio lean control is performed and the air-fuel ratio subsequently returns to the theoretical air-fuel ratio. It is seen from this diagram that the decrease amount cut coefficient KMKTTW varies in steps between 0 and 1 from when lean control begins to when it is terminated.

However, it may be determined that the count value STOFF≧120 seconds in the step S17 before the cooling water temperature TW≧$TW_P$ in the step S16. In this case, the routine immediately proceeds to the step S36, the decrease amount cut coefficient KMKTTW is decreased in decrements of DMKTWE#, and termination of lean control of the air-fuel ratio begins. This is based on the following hypothesis. It is considered that, under normal running conditions, the cooling water temperature TW should reach the catalyst activation water temperature $TW_P$ within 120 seconds after the engine starts, and if it does not do so even when 120 seconds has elapsed, there must be some fault. In such a case, therefore, lean control end processing is begun immediately. The step S17, by providing this failsafe function, improves the safety of the controller and guarantees engine running stability.

Hence, according to the aforesaid lean control, lean control is performed only during the time it is actually required depending on environmental conditions such as cooling water temperature on engine startup. The catalyst is therefore activated early, while engine stability during startup is maintained.

The embodiments of this invention in which an exclusive property or privilege is claimed are defined as follows:

What is claimed is:

1. A device for controlling an air-fuel ratio of a fuel mixture supplied to a water-cooled engine on startup of said engine, said engine being provided with a catalyst for purifying exhaust in an exhaust passage, said device comprising:

means for detecting said engine startup, means for detecting engine cooling water temperature, means for setting a catalyst activation water temperature corresponding to full activation of said catalyst, means for determining whether or not said cooling water temperature has reached said catalyst activation water temperature, and means for shifting said air-fuel ratio to a leaner state than a stoichiometric air-fuel ratio during a period from engine startup to when said cooling water temperature reaches said catalyst activation water temperature, and shifting back said air-fuel ratio in the leaner state towards the stoichiometric air-fuel ratio after said cooling water temperature has reached said catalyst activation water temperature.

2. An air-fuel ratio control device as defined in claim 1, wherein said device further comprises means for detecting an engine running state, and said shifting means comprises means for correcting leanness of said air-fuel ratio in the leaner state according to said running state.

3. An air-fuel ratio control device as defined in claim 1, wherein said device further comprises means for measuring an elapsed time after engine startup, and said shifting means comprises means for starting shifting of said air-fuel ratio to a leaner state when said measured time reaches a predetermined value.

4. An air-fuel ratio control device as defined in claim 1, wherein said shifting means comprises means for performing said shifting and shifting back in a stepwise manner.

5. An air-fuel ratio control device as defined in claim 1, wherein said device further comprises means for detecting an engine rotation speed, means for detecting an engine load, means for setting a basic fuel supply amount according to said engine rotation speed and load, means for setting a water temperature increase coefficient based on said cooling water temperature, and means for correcting said basic supply amount by said water temperature increase coefficient so as to determine a fuel supply amount, and said shifting means comprises means for shifting said air-fuel ratio to lean by correcting said water temperature increase coefficient.

6. An air-fuel ratio control device as defined in claim 1, wherein said device further comprises means for measuring an elapsed time after engine startup, and said shifting means comprises means for shifting back said air-fuel ratio in the leaner state towards the stoichiometric air-fuel ratio regardless of said cooling water temperature when said measured time has reached a predetermined value.

* * * * *